United States Patent [19]

White

[11] 3,825,762
[45] July 23, 1974

[54] APPARATUS FOR MEASURING LUMINESCENT RADIATION

[76] Inventor: John U. White, 80 Lincoln Ave., Darien, Conn. 06902

[22] Filed: Dec. 5, 1972

[21] Appl. No.: 312,295

Related U.S. Application Data

[63] Continuation-in-part of Ser. No. 277,390, Aug. 2, 1972.

[52] U.S. Cl. ............... 250/458, 250/252, 250/339, 356/51, 356/94, 356/97
[51] Int. Cl. ........................................ G01n 21/52
[58] Field of Search............. 356/51, 82, 88, 93–98; 250/361, 365, 368, 369, 458, 459, 461, 339–341, 252

[56] References Cited

UNITED STATES PATENTS 3,317,737  5/1967  Kopsel et al. ..................... 356/82

OTHER PUBLICATIONS

Heaps, Applied Optics, Volume 10, No. 9, September 1971, pages 2045–2059.
Cundall et al., Journal of Scientific Instruments (Journal of Physics E), Series 2, Vol. 1, 1968, pages 305–310.

Primary Examiner—Ronald L. Wibert
Assistant Examiner—F. L. Evans
Attorney, Agent, or Firm—Curtis, Morris & Safford; Lee C. Robinson, Jr., Esq.

[57] ABSTRACT

A luminescence spectrophotometer having an excitation monochromator and a dual channel emission monochromator which receives light through one channel to form a monochromatic calibration beam. The beam is then split into two parts. One part is directed to a first detector having known wavelength response characteristics, and the second part is sent back through the other monochromator channel to a second detector. The ratio of these detector outputs is measured to determine the relative transmission and sensitivity of the luminescence system at each wavelength. Monochromatic light from the excitation monochromator also is split into two parts, with one going to a sample of luminescent material and the other going to the first detector alternately with the first part of the calibration beam. The emitted light from the sample and the second part of the calibration beam are directed to opposite sides of a rotating chopper and then alternately through the second monochromator channel to the second detector. The readings from the two detectors are combined in an electrical circuit to obtain a ratio that is a function of the ratio of luminescent to excitation intensities and is independent of source brightness and detector sensitivity.

30 Claims, 16 Drawing Figures

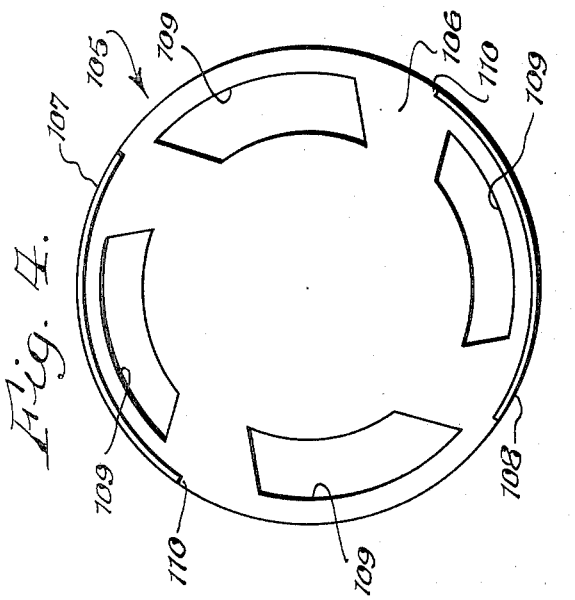
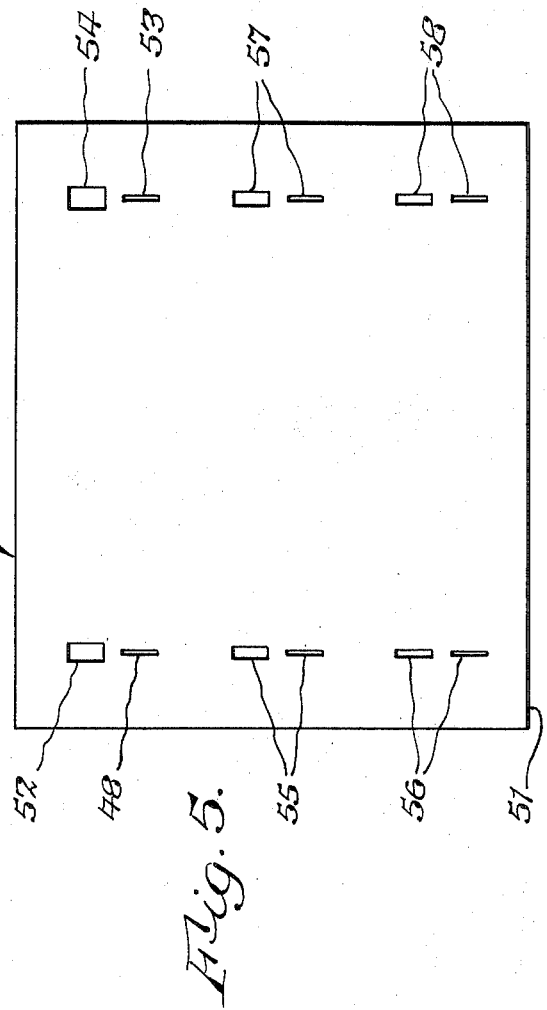
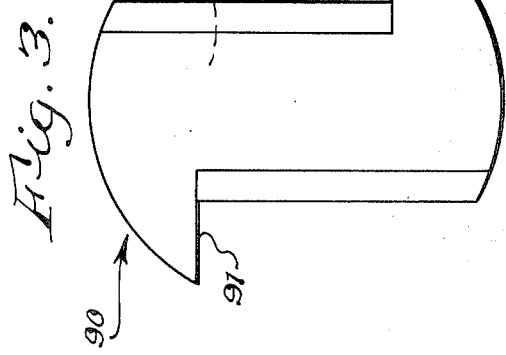
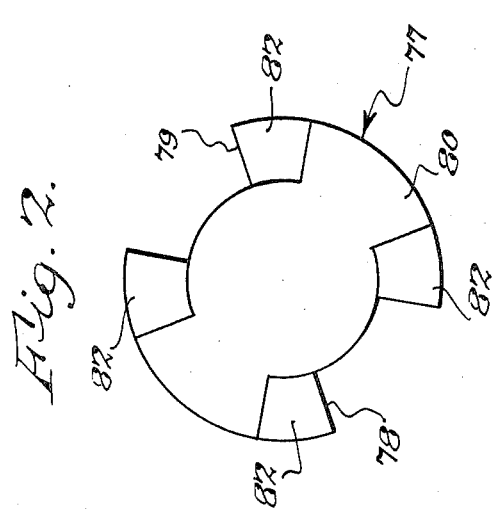
Fig. 4.
Fig. 3.
Fig. 2.
Fig. 5.

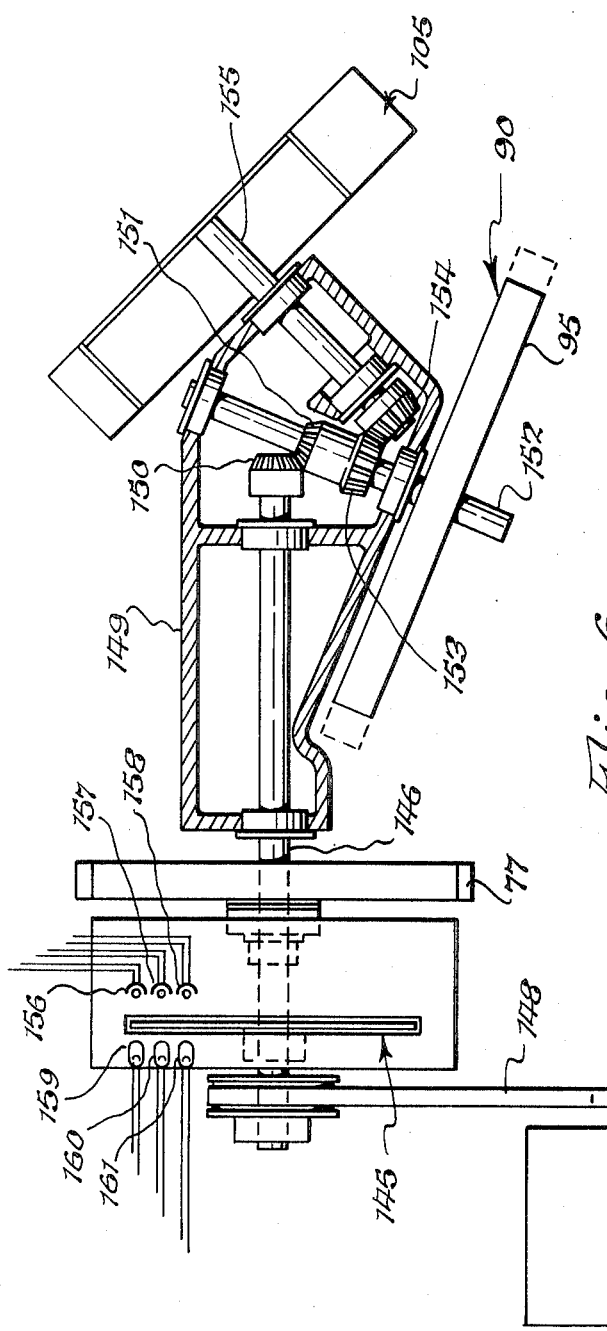
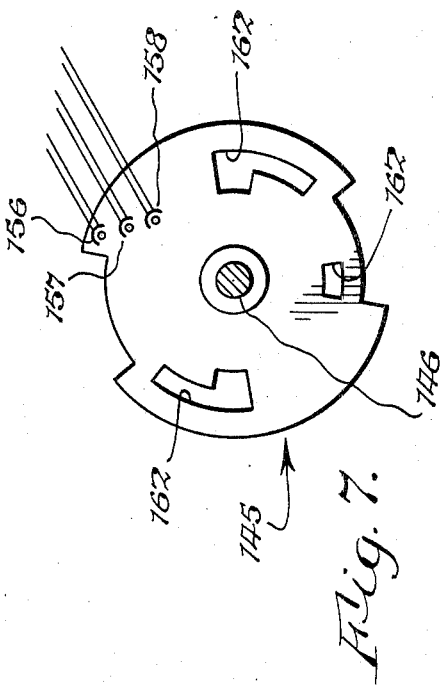

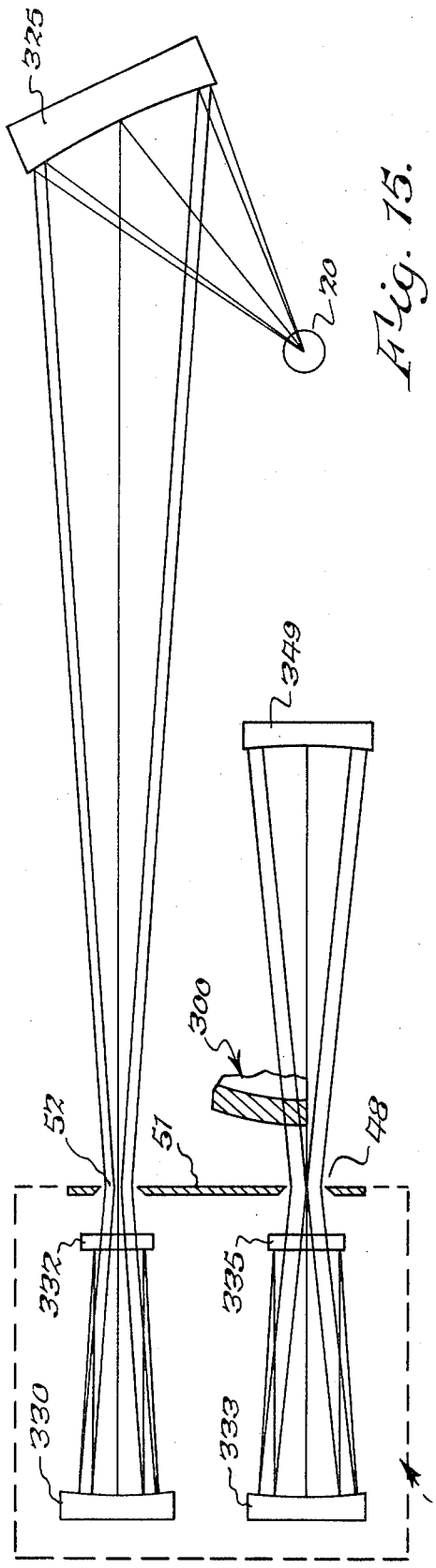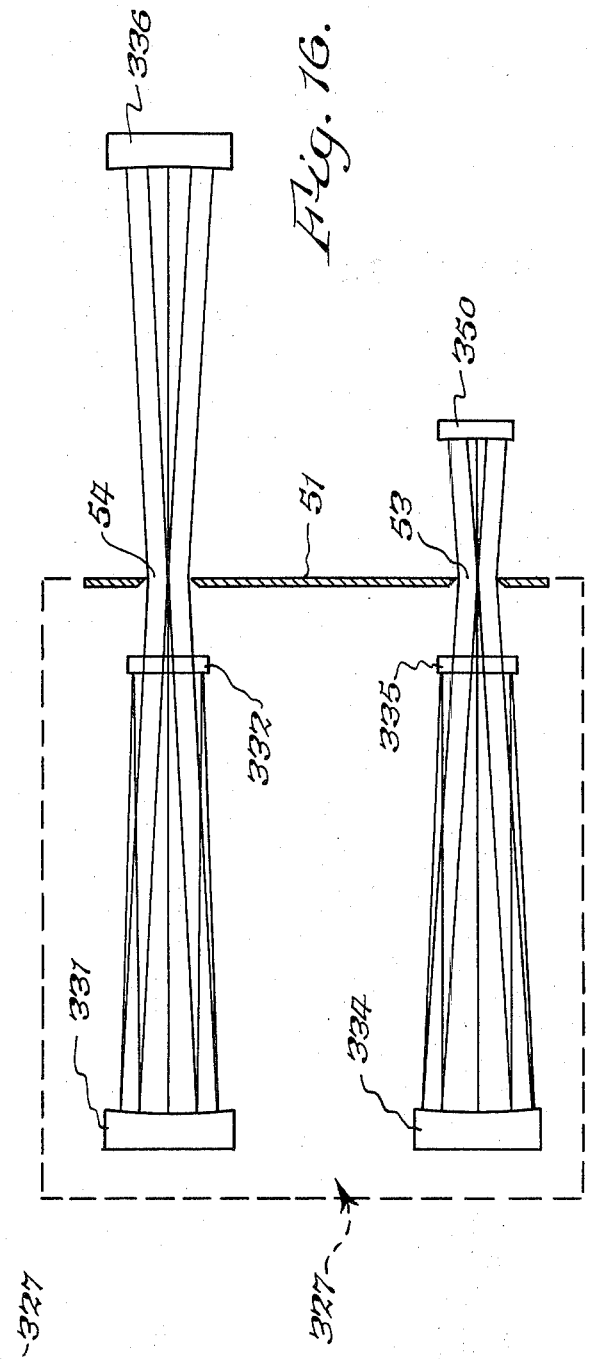

APPARATUS FOR MEASURING LUMINESCENT RADIATION

CROSS-REFERENCE TO RELATED APPLICATION

This application is a continuation-in-part of copending application Ser. No. 277,390 filed Aug. 2, 1972 by John U. White.

BACKGROUND OF THE INVENTION

This invention relates to luminescence spectroscopy, wherein a luminescent sample is irradiated with light of one wavelength and as a result gives off light of a different wavelength. As used herein, the term "light" includes not only visible light but also radiation having wavelengths longer and shorter than the visible spectrum.

In the luminescence spectroscopy field it is frequently important to measure the emission spectrum or wavelength distribution of the light emitted from the sample and also the ratio of the intensity of the emitted light to that of the exciting light. It is further important that the measurements of the emission and excitation spectra be independent of the wavelength distribution of the light source, the wavelength response curves of the detectors, and the transmission and reflection of the optical components.

Heretofore, difficulties have been encountered in determining the desired measurements with the requisite accuracy and sensitivity. Previous instruments for this purpose for the most part were calibrated on the basis of some form of memory system determined by preselected standards. In certain types of prior instruments a portion of the monochromatic light used to irradiate the sample was diverted to a so-called "color blind" detector, such as a thermocouple or a piece of fluorescent material in combination with a photoelectric detector, the material being selected to have the same fluorescent output independent of the wavelength of the exciting light. The light emitted from the sample was directed through a luminescence monochromator and was measured by a second detector. To correct for wavelength variations in the measurement of the luminescence spectrum, this latter monochromator often included a compensating cam calibrated against standard fluorescent materials having known wavelength response characteristics. The cam was responsive to the monochromator's wavelength drive mechanism to control a variable aperture and hence adjust the amount of light passing to the detector. In other systems variable electrical attenuators were used to adjust the output of the detector as a function of wavelength in accordance with a preselected program. However, the attenuators and other compensating devices of such prior instruments did not provide the requisite degree of accuracy for many types of measurements, and additional difficulties arose because of the frequent need to adjust the calibration of the devices in response to changes in the relevant instrument parameters.

SUMMARY

One general object of this invention, therefore, is to provide a new and improved instrument for measuring the intensity of light emitted from a luminescent sample with respect to the intensity of the light exciting the sample.

More specifically, it is an object of the invention to provide an instrument of the character indicated in which variations in the intensity and stability of the exciting light, and in the sensitivity and stability of the detection system, have little or no effect on the accuracy of the measurements.

Another object of the invention is to provide such an instrument of substantially improved sensitivity.

Still another object of the invention is to provide a luminescence spectrophotometer in which the various operating parameters may be readily changed without the need for recalibrating the instrument after each change.

A still further object of the invention is to provide a luminescence spectrophotometer utilizing comparatively simple optical components which is economical to manufacture and thoroughly reliable in operation.

In a preferred embodiment of the invention, there is employed a dual channel emission monochromator which receives light from the exciting light source and isolates a highly monochromatic calibration beam, splits this beam into two parts, measures one part with a "color blind" calibration detector, and sends the other part back through a different channel in the same monochromator to the regular fluorescence detector. The ratio of the resulting outputs from the two detectors is a measure of the relative transmission and sensitivity of the luminescence system at each wavelength.

The calibration detector and the luminescence detector are used only part of the time to obtain the calibration measurements. During another part of the time, by means of one or more beam switching reflecting choppers, the calibration and fluorescence detectors measure the exciting light and the emitted light, respectively. The four readings are combined in an electrical circuit to obtain a signal that is a function of the ratio of luminescent to excitation intensities and is independent of source brightness and detector sensitivity.

In several advantageous embodiments, at least a portion of the calibration beam is converted into scattered depolarized light. Magnesium oxide smoke, barium sulphate and some other scattering materials have diffuse reflection coefficients so close to unity that their losses are generally assumed to be independent of wavelength. With this arrangement, the final result is closely proportional to the fluorescent output in terms of light emitted per unit of light falling on the sample.

In some advantageous embodiments an additional chopper is employed to correct for background or dark signals from the detectors. The chopper is located immediately adjacent the entrance slits of the dual channel monochromator in position to simultaneously interrupt the light in both channels at regular intervals. During the interruptions the signals from the detectors are measured and re-used to provide the desired correction.

The present invention, as well as further objects and advantages thereof, will be understood more clearly and fully from the following description of a preferred embodiment, when read with reference to the accompanying drawings.

BRIEF DESCRIPTION OF THE DRAWINGS

FIG. 2 is a partially schematic elevational view of one of the reflecting choppers for the spectrophotometer, as seen from the line 2—2 in FIG. 1.

FIG. 3 is a partially schematic elevational view of another of the choppers as seen from the line 3—3 in FIG. 1.

FIG. 4 is a partially schematic elevational view of still another chopper as seen from the line 4—4 in FIG. 1.

FIG. 5 is a partially schematic elevational view of the entrance plate for one of the monochromators of the spectrophotometer, as seen from the line 5—5 in FIG. 1.

FIG. 6 is a horizontal partially sectional view of the chopper drive mechanism.

FIG. 7 is a partially schematic elevational view of a further chopper as seen from the line 7—7 in FIG. 1.

FIG. 13 is a partially schematic sectional view taken along the line 13—13 in FIG. 12, with certain components omitted for purposes of clarity.

FIG. 14 is a partially schematic elevational view of a reflecting chopper for the spectrophotometer of FIG. 12, as seen from the line 14—14 in that figure.

FIG. 15 is a partially schematic sectional view taken along the line 15—15 in FIG. 12, with certain components omitted for purposes of clarity.

FIG. 16 is a partially schematic sectional view taken along the line 16—16 in FIG. 12, with certain portions omitted for purposes of clarity.

DESCRIPTION OF CERTAIN PREFERRED EMBODIMENTS

Figure 1:
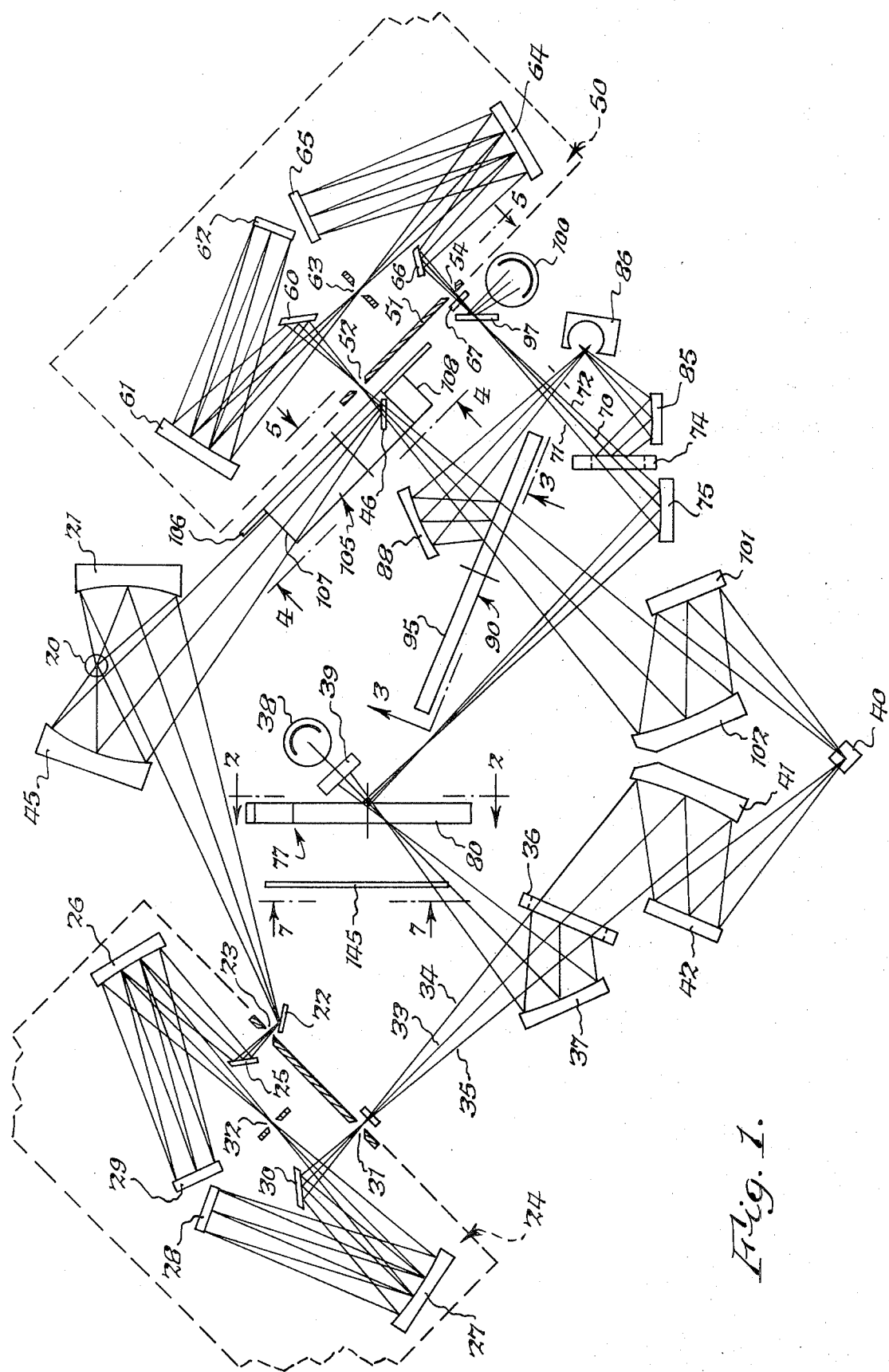
FIG. 1 is a simplified schematic plan view, with portions shown in section, of a luminescence spectrophotometer in accordance with one illustrative embodiment of the invention.

Referring to FIG. 1 of the drawings, there is shown a schematic representation of a luminescence spectrophotometer having a suitable source 20 of visible or invisible light. Light from the source 20 is collected by an ellipsoidal mirror 21 and is reflected onto a flat directional mirror 22. This latter mirror directs the light onto an entrance slit 23 of an excitation monochromator 24. The monochromator 24 is of the double Littrow type and includes, in addition to the entrance slit 23, an entrance mirror 25, a pair of collimating mirrors 26 and 27, a pair of reflection gratings 28 and 29, an exit mirror 30 and an exit slit 31. The light entering the entrance slit 23 is reflected by the mirrors 25 and 26 to the grating 28, then back to the mirror 26 and through a slit 32 to the mirror 27, then to the grating 29, then back to the mirror 27, and then to the mirror 30 and the exit slit 31.

The light emerging from the monochromator exit slit 31 is in the form of a monochromatic excitation beam, the path of which is represented schematically in FIG. 1 by a principal ray 33 and two side rays 34 and 35. The monochromatic beam is received by a beam splitter 36. The splitter 36 illustratively is in the form of a mirror perforated with a large number of conical holes, or it may comprise a series of spaced bars having reflective surfaces facing the incoming light. A fixed fraction of this light is diverted by the splitter 36 in a diagonally upward direction to a toroidal mirror 37 and then to a calibration detection system which comprises a photoelectric detector 38 and a fluorescent member 39. The light passes through the member 39, which illustratively contains a rhodamine solution to convert all shorter wavelengths to an equivalent amount of red fluorescence, and is received by the detector 38. The calibration detection system thus has known response characteristics and is effective to produce an excitation signal corresponding to the intensity of the excitation beam.

Another portion of the excitation light beam passes through the beam splitter 36 and is reflected onto a sample 40 of luminescence material by directional mirrors 41 and 42. The sample 40 is excited by the incident light and emits fluorescence of a wavelength different from that of the exciting light.

Light from the source 20 also is collected by an ellipsoidal mirror 45 and is reflected onto a flat directional mirror 46. The mirror 46 directs the light to an entrance slit 48 (FIG. 5) of a dual channel luminescence monochromator 50. The monochromator 50 is provided with a plate 51 having, in addition to the entrance slit 48, another entrance slit 52 for the second channel and a pair of corresponding exit slits 53 and 54. The plate 51 includes additional pairs of entrance slits 55 and 56 and exit slits 57 and 58 of various widths to provide a choice of slits and thus obtain the optimum combination of intensity and resolution for the making of a particular measurement. In some cases, the widths of the slits are made adjustable to provide an even wider choice of slit widths. The two monochromator channels are arranged in the double Littrow configuration and are set to isolate light of the same wavelength in accordance with the measurement being made.

The light entering the entrance slit 48 is reflected by a flat directional mirror 60 and a collimating mirror 61 onto a reflection grating 62. The light is then returned to the collimating mirror 61 and proceeds through an intermediate aperture or slit 63 to a second collimating mirror 64 and a second reflection grating 65. From the grating 65 the light is returned to the collimating mirror 64 and is then directed to a flat directional mirror 66 leading to the exit slit 53. After emerging from the exit slit, the light passes through a filter 67.

The light from the exit slit 53 and the filter 67 comprises a highly monochromatic calibration beam which is represented schematically in FIG. 1 by a principal ray 70 and two side rays 71 and 72. The beam is received by a beam splitter 74 of a construction similar to the beam splitter 36 described heretofore. A fixed fraction of the light passes through the splitter 74 and is directed by a toroidal mirror 75 to one side of a continuously rotating sector mirror or reflecting chopper 77. As best shown in FIG. 2, the chopper 77 includes diametrically opposed cut-outs 78 and 79. One face of the chopper is provided with a mirror surface 80 covering the major portion of its area and four black surfaces 82 which are arranged adjacent the edges of the cut-outs. The location of the chopper 77 is such that the mirror surface 80 is in position to reflect the monochromatic calibration light from the mirror 75 to the detector 38.

The reflecting chopper 77 is interposed in the light path between the toroidal mirror 37 and the detector 38. As the chopper rotates, the part of the excitation beam from the mirror 37 is periodically interrupted by the portion of the chopper intermediate the cut-outs 78 and 79. During these intervals the monochromatic calibration beam is directed by the mirror surface 80 to the detector. The calibration beam reaches the chopper at the same point where the excitation beam emerges through the cut-outs. The arrangement is such that the detector 38 is alternately exposed to light originating in the excitation beam and in the calibration beam. The detector thus produces alternate signals proportional to the amounts of light in the excitation and calibration beams. In the illustrated embodiment the fluorescent member 39 has a constant quantum yield over a comparatively wide spectral range, with the result that the signals are proportional to the numbers of photons in the two beams. The fluorescent emission from the member 39 is independent of the wavelength of the light falling on it, and the output of the detector 38 is unaffected by variations of sensitivity with wavelength.

The remaining fraction of the monochromatic calibration beam is diverted by the beam splitter 74 to a toroidal mirror 85. The mirror 85 directs the beam to a diffuse reflector 86. The reflector serves to convert the incident beam into diffuse, depolarized light emitted in all directions, and it thus acts as an auxiliary reference source.

A portion of the scattered reference light from the diffuse reflector 86 is collected by a mirror 88 and is directed to one side of a rotating sector mirror or reflecting chopper 90. The chopper 90 includes diametrically opposed cut-outs 91 and 92 (FIG. 3) and a mirror surface 95 on the face adjacent the mirror 88. In a manner that will become more fully apparent hereinafter, the chopper 90 is continuously rotated at the same speed as that of the chopper 77.

When the mirror surface 95 is in the path of the monochromatic reference light from the mirror 88, the light is reflected to the upper channel entrance slit 52 of the liminescence monochromator 50. The light is directed through the monochromator 50 along the path described heretofore and emerges through the upper channel exit slit 54 and the filter 67. The emerging light is directed by a mirror 97 to a photoelectric detector 100. The detector 100 is of conventional construction and preferably is of a type which exhibits high sensitivity at the particular wavelengths of interest.

Luminescent emission from the sample 40 is directed toward the chopper 90 and the monochromator 50 by a pair of mirrors 101 and 102. The chopper 90 is located in the light path between the mirror 102 and the monochromator entrance slit 52. As the chopper rotates, the luminescent beam is periodically interrupted by the face of the chopper adjacent the mirror 102 to prevent the beam from reaching the monochromator. Upon continued rotation of the chopper, the cut-outs 91 and 92 admit the luminescent beam to the upper channel entrance slit 52, while the reference light is no longer received by the slit. The luminescent beam emerges from the cut-outs at the same point as the reference beam reaches the chopper, with the result that both beams are directed to the same portion of the upper channel.

The entrance slit 52 of the emission monochromator 50 is thus alternately illuminated by light from the luminescent sample 40 and by reference light from the monochromatic calibration beam. The sample light and the reference light pass successively through the same monochromator channel and are directed from the filter 67 and the mirror 97 to the same detector 100. The light received by the detector 100 comprises a monochromatic beam including a first portion representing the unknown luminescent intensity being measured and a second portion representing the reference or calibration intensity.

To take into account the background or dark signals from the photoelectric detector 100, the instrument is provided with a third chopper 105. The chopper 105 is rotated at the same speed as that of the choppers 77 and 90 and is located immediately in front of the entrance slits 48 and 52 in position to interrupt the light entering the two monochromator channels at regular intervals. As best illustrated in FIG. 4, the chopper 105 is generally in the shape of a shallow cup and includes a flat disc portion 106 and two rim portions 107 and 108. The disc portion 106 has four equally spaced openings 109 adjacent its periphery. The rim portions 107 and 108 are arranged in diametrically opposed relationship with each other to provide a pair of additional openings or gaps 110 in the rim. In the manner shown in FIG. 1, the rim portions are positioned in the path of the beam from the mirror 45 to provide two interruptions of this beam for each revolution of the chopper.

Figure 8:
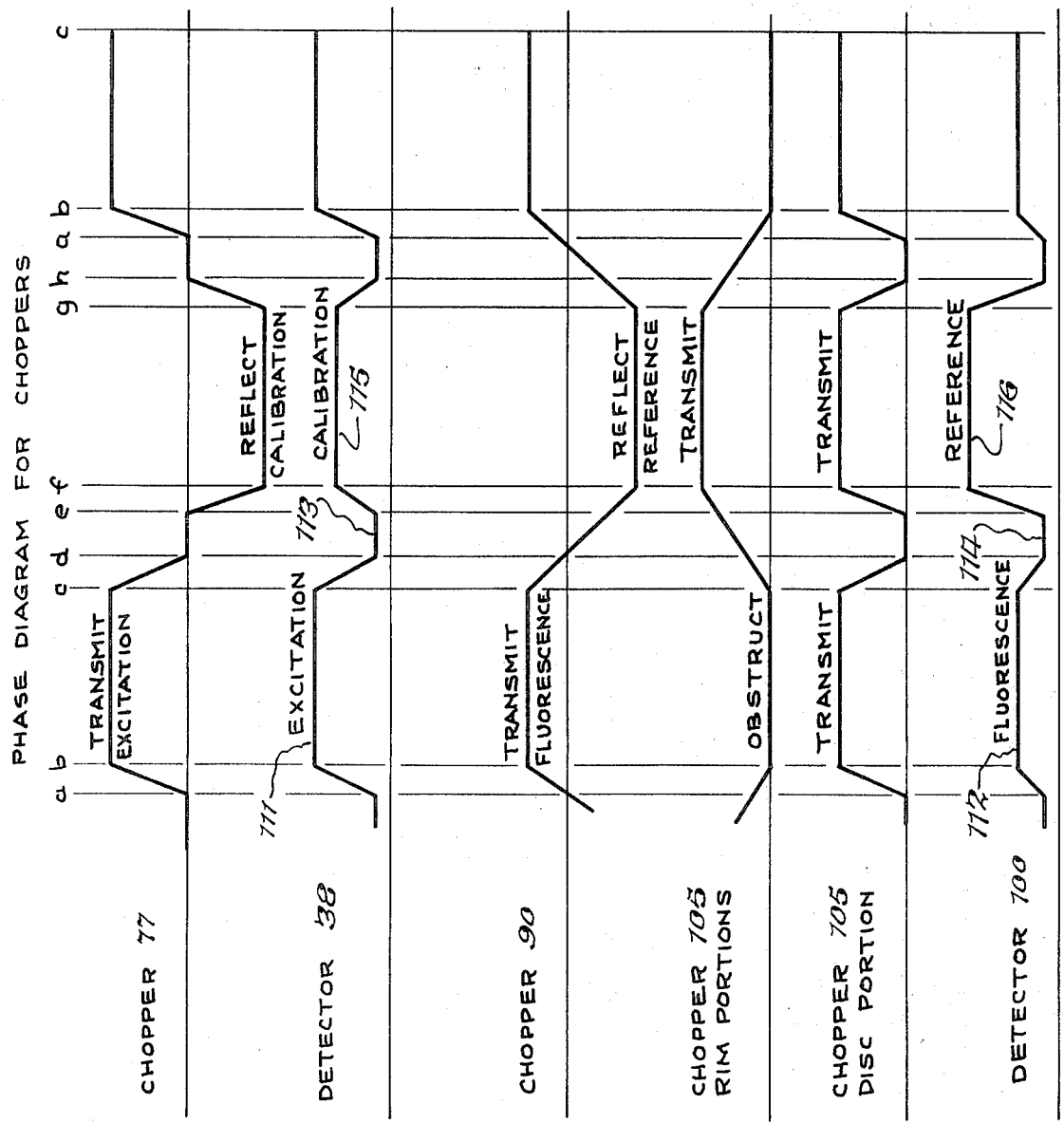
FIG. 8 is a diagrammatic representation of the timed relationship between the choppers and the detector outputs for the spectrophotometer.

The timing of the reflecting choppers 77 and 90, the rim portions 107 and 108 of the chopper 105, and the disc portion 106 of the chopper 105, is synchronized in the manner illustrated by the successive curves shown in FIG. 8. The distance between point $a$ in this figure and the succeeding point $a$ represents the one-half revolution of the choppers. At point $a$, the chopper 90 is partially open, the chopper 77 and the disc portion of the chopper 105 begin to open, and one of the rim portions of the chopper 105 is closing to block the calibration light from the mirror 45 (FIG. 1). At point $b$, the choppers 77 and 90 and the disc portion of the chopper 105 are completely open. They remain so until reaching point $c$. During this interval, an excitation current signal 111 corresponding to the intensity of the monochromatic excitation beam appears at the output of the detector 38, and a luminescence current signal 112 corresponding to the intensity of the monochromatic luminescent beam appears at the output of the detector 100. The rim of the chopper 105 continuously obstructs the light between the mirrors 45 and 46 to positively prevent the calibration light from affecting the luminescence signal.

At point $c$, the choppers 77 and 90 and the disc portion of the chopper 105 start to close, becoming completely closed at points $d, f$ and $d$, respectively. Between point $d$ and point $e$ one of the black surfaces 82 (FIG. 2) of the chopper 77 is interposed in the light path, and the current signal 113 at the output of the detector 38 corresponds to the dark current. A dark current signal 114 also appears between points $d$ and $e$ at the output of the detector 100. At respective points $c$ and $e$, the rim and disc portions of the chopper 105 start to open, each becoming completely open at point $f$.

From point $f$ to point $g$ the choppers 77 and 90 remain closed, and both portions of the chopper 105 remain open. During this interval the mirror surface 80 of the chopper 77 reflects the first portion of the calibration beam from the mirror 75 and directs it to the detector 38. Between points $f$ and $g$ the detector 38 produces a current signal 115 representative of the detected calibration radiation from the source 20 after its traversal of the lower channel of the luminescence monochromator 50. During this same interval the mirror surface 95 of the chopper 90 reflects the second portion of the calibration beam, that is, the reference beam from the mirror 88, and directs the beam to the upper channel of the monochromator 50. The detector 100 produces a current signal 116 which is representative of the excitation source after its successive traversal of both channels of the monochromator.

At point $g$ the choppers 77 and 90 again begin to open. Simultaneously, the disc and rim portions of the chopper 105 begin to close and reach their fully closed positions at points $h$ and the succeeding point $b$, respectively. Between points $h$ and $g$ all light is again blocked from the entrance slits 48 and 52 of the monochromator 50. Between points $a$ and $b$ the disc portion of the chopper 105 reopens, and the choppers 77 and 90 reach their fully open positions.

The arrangement is such that the lower channel of the luminescence monochromator 50 is periodically illuminated with light from the excitation source 20 at a frequency determined by the chopper 105. A first portion of the resulting monochromatic calibration beam is periodically directed by the reflecting chopper 77 to the detector 38, to produce the calibration signal 115. A first portion of the monochromatic beam from the excitation monochromator 24 is directed to the detector 38 alternately with the calibration beam to produce the excitation signal 111 at the detector. The upper channel of the monochromator 50 is alternately illuminated with the remaining portion of the monochromatic reference light and with light from the luminescent sample 40. The resulting variable beam from the upper channel is received by the detector 100 to produce successive signals 116 and 112 respectively representative of the reference intensity and of the unknown luminescent intensity. As will be understood, during the intervals in which the choppers prevent light from reaching the monochromators, the two detectors produce dark or background signals.

Figure 9:
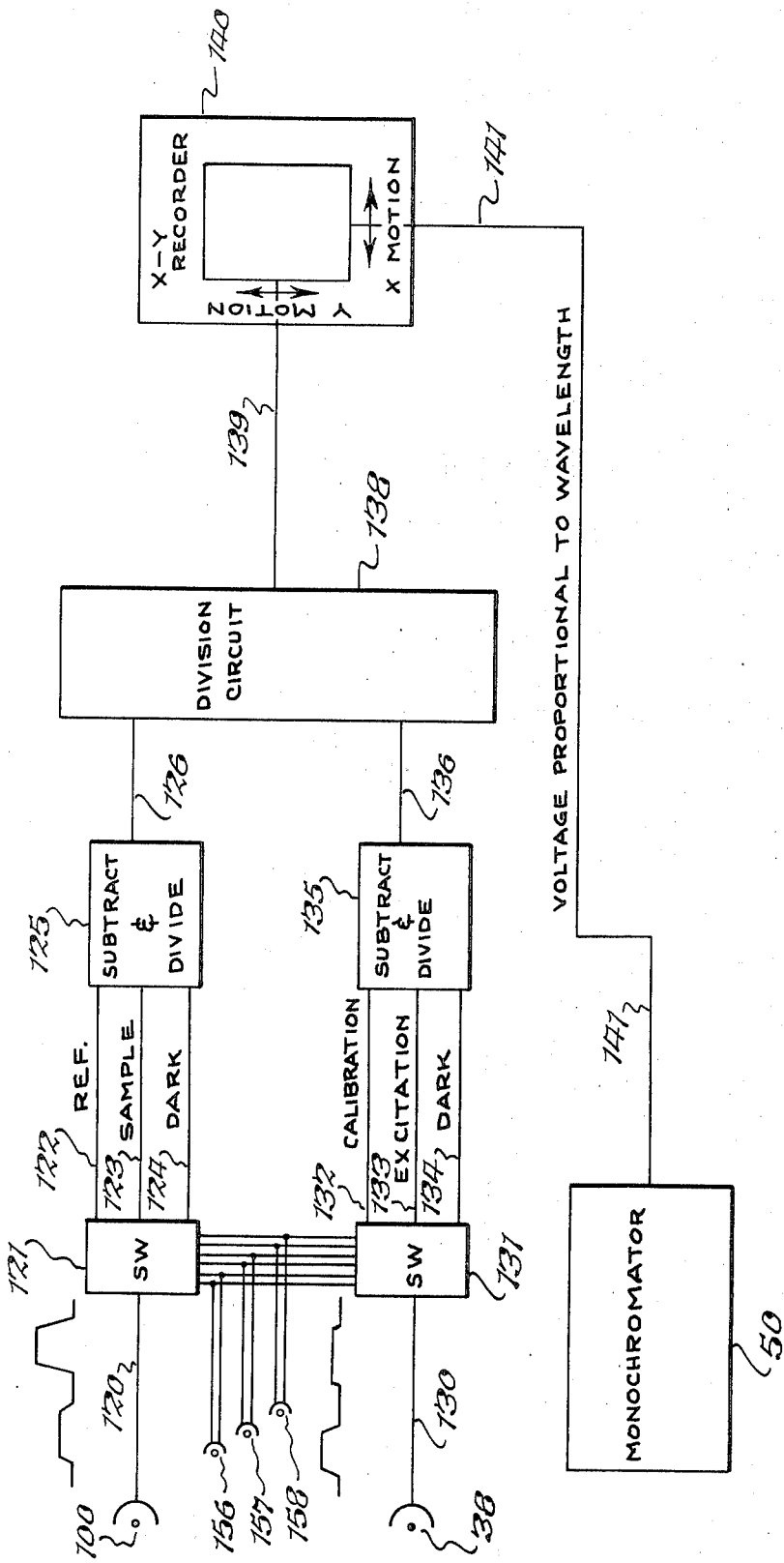
FIG. 9 is a schematic block diagram of the electrical circuit for the spectrophotometer.

The photoelectric detectors 38 and 100 are connected in an electrical circuit shown schematically in FIG. 9. The signal from the detector 100 is transmitted over a lead 120 to a switching circuit 121. The circuit 121 is effective to separate the reference portion, the sample portion and the dark portion of the incoming signal and to apply the separated portions to respective leads 122, 123 and 124. The separated portions of the signal are received by a circuit 125 which operates in known manner to subtract the dark signal on the lead 124 from the reference and sample signals on the leads 122 and 123 and to then divide the sample signal by the reference signal. The signal appearing on the output lead 126 from the circuit 125 thus corresponds to the ratio of the net sample signal to the net reference signal.

The signal from the detector 38 is transmitted over a lead 130 to a second switching circuit 131. The circuit 131 serves to separate the calibration signal, the excitation signal and the dark or no-input signal of the detector 38 and to apply the respective signals to output leads 132, 133 and 134. These leads are connected to a circuit 135 in which the dark signal is subtracted from the calibration and excitation signals and the excitation signal is then divided by the calibration signal. The resulting signal corresponds to the ratio of the net excitation signal to the net calibration signal and is sent out over an output lead 136.

The signals on the leads 126 and 136 are received by a division circuit 138. The circuit 138 is effective to divide the signal on the lead 126 by that on the lead 136 to produce an output signal on a lead 139 corresponding to the quotient of the ratio of the sample to the reference signal from the lead 126 divided by the ratio of the excitation signal to the calibration signal from the lead 136. The signal on the lead 139 thus corresponds to the ratio of the intensity of the luminescent sample to the intensity of the excitation source multiplied by a correction factor corresponding to the ratio of the calibration signal to the reference signal. The effect of this correction factor is to cancel out errors such as those which result from the sensitivity of the detector 100, and the transmission and reflection of the luminescence monochromator. The signal on the lead 139 constitutes an accurate representation of the ratio of luminescent to excitation intensities and is independent of source brightness, source wavelength distribution, detector sensitivity, and transmission and reflection variables.

The output signal on the lead 139 is applied to the $y$-axis input terminal of an $x$-$y$ recorder 140. The $x$-axis input terminal of the recorder receives a voltage over a lead 141 from one of the monochromators, illustratively the emission monochromator 50, which is proportional to the particular wavelength being used for measurement. The recorder thus produces a continuous graph of the luminescence to excitation intensity ratio with respect to wavelength.

FIG. 6 is illustrative of a suitable drive mechanism for the various choppers. In addition to the choppers 77, 90 and 105 described heretofore, the instrument includes a fourth chopper 145 which is effective to control the signal switching circuits 121 and 131 (FIG. 9). The chopper 145 is affixed to a drive shaft 146. This shaft is rotated at a constant speed, illustratively 1,800 rpm, by an electric motor 147 and a belt 148. The shaft is keyed or otherwise secured to the reflecting chopper 77 and extends into a housing 149 where its inner end is provided with a bevel gear 150. The gear 150 is in meshing engagement with a bevel gear 151 on a shaft 152 which supports the reflecting chopper 90. The shaft 152 carries an additional bevel gear 153 which meshes with a bevel gear 154 on an angularly disposed shaft 155. This latter shaft supports the chopper 105 in the proper angular relationship with respect to the chopper 90. The various gear ratios are such that each of the choppers 77, 90, 105 and 145 is rotated at the same speed.

The chopper 145 comprises a thin, substantially circular blade which is provided with three photoelectric cells 156, 157 and 158 on one side of the chopper and three cooperating light sources 159, 160 and 161 on the other side. As best shown in FIG. 7, the chopper 145 includes suitable openings 162 which are arranged to permit light from the sources 159, 160 and 161 to reach the corresponding photocells 156, 157 and 158 in a predetermined sequence corresponding to the particular switching function being performed by the circuits 121 and 131 (FIG. 9). In cases in which the reference and calibration signals are being measured, for example, the photocell 156 is activated to apply an enabling signal to the circuits 121 and 131, while the photocell 157 similarly applies an enabling signal to the two circuits during the measurement of the dark signals. When the sample and excitation signals are being measured, the photocell 158 applies an enabling signal to the circuits. The circuits 121 and 131 transmit the reference, calibration, dark, sample and excitation signals to the ensuing circuits 125 and 135, in accordance with the sequence described above.

Because the two channels of the luminescence monochromator 50 are adjusted to select light of the same wavelength, the monochromatic light that has been isolated from the excitation source 20 by the lower channel (the light represented by the rays 70, 71 and 72 in FIG. 1) has the appropriate wavelength to pass freely through the upper channel. Both monochromator channels operate at unit magnification and at the same dispersion. By making the width of the upper channel exit slit 54 (FIG. 5) greater than that of the upper channel entrance slit 52 and substantially greater than those of the lower channel slits 48 and 53, all of the reference light rays entering the slit 52 emerge through the central part of the slit 54 without losses due to the slit jaws. In certain particularly advantageous embodiments, the effective width of the slit 54 is greater than the sum of the effective widths of the slits 48, 52 and 53. With this arrangement, there is no change in the spectral width of the reference light during its second traversal of the monochromator, and the wavelength distribution of the reference light reaching the detector 38 is the same as that reaching the detector 100. The relative outputs of the two detectors depend only on their relative sensitivities and on the geometry and reflection conditions of the various light paths.

In the embodiment of FIGS. 1-9 the light paths for the two portions of the excitation beam, the two portions of the calibration beam, and the reference and luminescent beams, are balanced such that the beams are subjected to equal losses which cancel one another and do not appear in the final measurement. With respect to the monochromatic beam emerging from the excitation monochromator 24, the portion of the light reaching the detector 38 undergoes two reflections, one by the beam splitter 36 and one by the mirror 37, at angles of incidence which are each 22.5 degrees. The remaining portion of the light directed toward the sample 40 also undergoes two reflections, one by the mirror 41 and one by the mirror 42, at 22.5 degree angles of incidence. The combined reflectivity of the splitter 36 and the mirror 37 is equal to that of the mirrors 41 and 42, and since the light traverses the same path through the monochromator 24 the monochromator losses are equal. Accordingly, the light beams reaching the detector 38 and the sample 40 are both attenuated by the same reflection losses, and the ratio of the radiant energy falling on the detector and the sample is independent of wavelength and the state of polarization of the light leaving the monochromator 24.

Similarly, the two portions of the calibration beam emerging from the luminescence monochromator exit slit 53 (FIG. 5) undergo the same number of specular reflections at the same angles of incidence as they proceed through the optical system along the respective paths to the detector 38 and the diffuse reflector 86. Thus, the portion of the light passing through the beam splitter 74 is reflected by the mirror 75 and the reflective surface 80 of the chopper 77 at angles of incidence of 22.5°, and the remaining portion of the light is reflected by the beam splitter 74 and the mirror 85 at these same angles of incidence. The reflecting coatings are the same on all the mirrors. With this arrangement the ratio of the calibration light reaching the detector 38 and that reaching the diffuse reflector 86 remains the same irrespective of reflection losses, wavelength or polarization effects.

The light paths for the reference and luminescent beams also are balanced as they pass through the optical system leading to the upper channel entrance slit 52. The reference light from the diffuse reflector 86 is reflected by the mirror 88 and the reflective surface 95 of the chopper 90 at angles of incidence of 22.5° before being directed to the entrance slit. The light directed from the luminescent sample 40 to the entrance slit also undergoes two reflections, by the mirrors 101 and 102, at 22.5° angles of incidence. For mirrors of equal reflectivity, the reference beam and the luminescent beam are both attenuated by the same amount upon reaching the entrance slit. Since both of these beams traverse the same path through the monochromator, their monochromator losses are equal, and since both have the same wavelength the sensitivity of the detector 100 is the same for both. Accordingly, in cases in which the luminescent emission from the sample is unpolarized, the resulting measurement accurately represents the ratio of the fluorescence intensity to the reference intensity. If the sample emission is highly polarized, the measurement remains accurate provided a polarizer (not shown) of conventional construction is inserted in the beam between the chopper 95 and the slit 52.

It will be noted that the monochromators 24 and 50 are each arranged as a double Littrow monochromator, with the second monochromator in each case offset with respect to the first monochromator. The principal ray first approaching each collimating mirror 26 and 27 in the monochromator 24 is between the dispersing means 28 and 29 and the principal ray last leaving the collimator, and the optical locations of the entrance and exit slits 23 and 31 are on opposite sides of the intermediate slit 32. Similarly, the principal ray first approaching each collimating mirror 61 and 64 in the monochromator 50 is between the dispersing means 62 and 65 and the principal ray last leaving the collimator, and for each channel the optical entrance and exit slits are on opposite sides of the intermediate slit. As more fully explained in the copending application referred to above, as the dispersing means are pivoted to change the wavelenth, the width of the image at the corresponding exit slit remains the same, and the deleterious effects of grating magnification are avoided. Each monochromator provides unit magnification throughout all grating angles for which the instrument is designed, and the monochromators are also corrected for coma at all wavelengths.

In other advantageous embodiments the excitation and luminescence monochromators each include only a single reflection grating or other dispersing means. In the embodiment illustrated in FIG. 10, for example, there is shown an excitation monochromator 200 and a luminescence monochromator 201 which perform functions similar to those of the monochromators 24 and 50 (FIG. 1) described heretofore. The monochromator 200 includes only a single collimating mirror 202 and a single reflection grating 203, and the monochromator 201 similarly includes only a single collimator 204 and a single grating 205. The excitation light from the source 20 and the mirrors 21 and 22 passes through the entrance slit 23 of the monochromator 200 and is reflected by the mirror 202 to the grating 203. The light is then returned to the mirror 202 and is directed toward the exit slit 31. The resulting monochromatic beam is divided by the beam splitter 36 into two parts which follow separate paths through the corresponding optical system to the detector 38 and the luminescent sample 40 in the manner discussed above.

The lower entrance slit of the luminescence monochromator 201 also is illuminated with light from the source 20. An ellipsoidal mirror 208 receives light from the source and directs it to a pair of angularly disposed flat mirrors 209 and 210. These latter mirrors are superimposed one above the other and serve to lower the incoming light to the level of the lower entrance slit. The light from the mirror 210 is reflected by a directional mirror 211 through the lower slit to the collimating mirror 204. From the mirror 204 the light proceeds to the reflection grating 205, then back to the mirror 204 and then exits from the monochromator 201 in the form of a highly monochromatic calibration beam. Contrary to the double monochromators in the embodiment of FIG. 1, the monochromator 201 does not form an intermediate image, and the calibration beam therefore emerges from the upper exit slit. The emerging beam passes through a suitable filter 212.

The level of the monochromatic calibration beam from the monochromator 201 is lowered by a pair of superimposed flat mirrors 214 and 215. The beam then proceeds to a beam splitter 216. A fixed fraction of the beam passes through the splitter 216 and is reflected by the mirror 75 and the reflective surface 80 of the chopper 77 to the detector 38. As the chopper 77 rotates, the detector 38 produces alternate signals which respectively correspond to the intensity of the calibration beam and the intensity of the monochromatic excitation beam from the mirror 37.

The remaining fraction of the calibration beam from the mirrors 214 and 215 is reflected by the beam splitter 216 and a flat mirror 217 to a diffuse reflector 220. The reflector 220 includes a uniform white reflective surface, such as barium sulphate or magnesium oxide, that exhibits high reflectance throughout the spectral range of interest. The reflector serves to convert the incident beam into diffuse, depolarized light emitted in all directions, and it thus acts as an auxiliary source of reference light.

Figure 11:
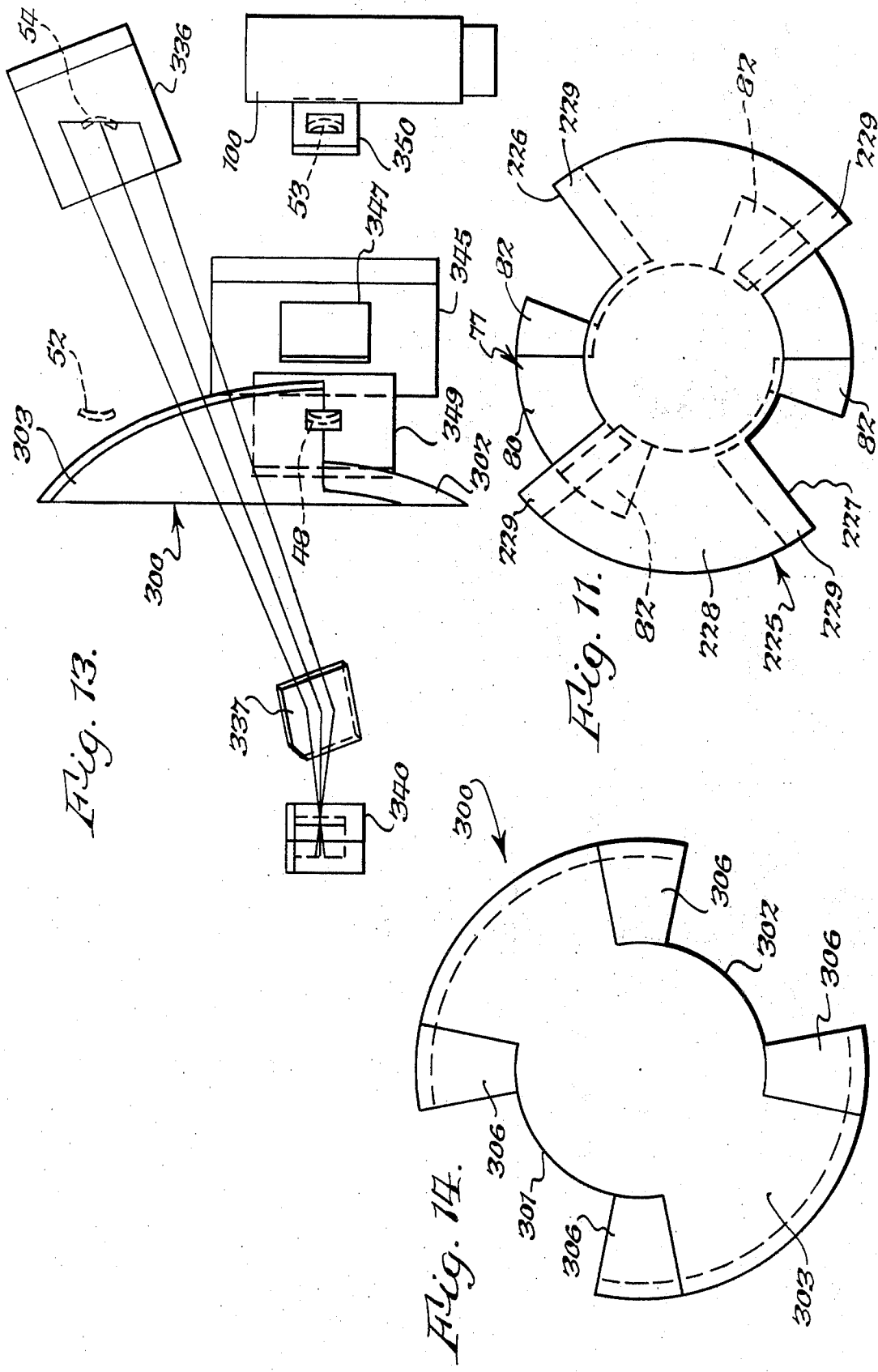
FIG. 11 is a partially schematic elevational view of the two reflecting choppers for the spectrophotometer of FIG. 10, as seen from the line 11—11 in that figure.

A curved mirror 222 receives a portion of the scattered reference light from the diffuse reflector 220. The mirror 222 directs the light to one side of a rotating sector mirror or reflecting chopper 225. As best shown in FIG. 11, the reflecting chopper 225 is of two-bladed configuration and includes diametrically opposed cut-outs 226 and 227. The face of the chopper 225 which receives the reference light from the mirror 222 is provided with a reflecting surface 228. As illustrated by the dotted areas 229, the radial edges of the cut-outs 226 and 227 are beveled to provide sharp chopping edges. The chopper 225 is maintained in coaxial, fixed relationship with the chopper 77, and the cut-outs 226 and 227 are angularly spaced from the cut-outs 78 and 79 of this latter chopper by about 120 degrees.

When the reflecting surface 228 is in the reference light path, the light is reflected to the upper entrance slit of the monochromator 201. The light proceeds through the monochromator 201 along the path described above and emerges through the lower exit slit. From the lower exit slit the light passes through the filter 212 and is directed by a flat mirror 230 to the photoelectric detector 100.

The light emitted from the luminescent sample 40 proceeds from the mirrors 101 and 102 to the chopper 225. In a manner similar to that descibed heretofore with respect to the chopper 90 of FIG. 1, the chopper 225 is located in the light path between the mirror 102 and the upper entrance slit of the emission monochromator 201. The chopper rotates at a fixed speed, and the luminescent beam from the mirror 102 is periodically interrupted by the adjacent face of the chopper to prevent the beam from reaching the monochromator. As the chopper continues its rotation, the cut-outs 226 and 227 admit the luminescent beam to the upper entrance slit, while the reference beam from the mirror 222 is no longer received by the slit. The luminescent beam emerges from the cut-outs at the same point that the reference beam reaches the chopper, such that both beams illuminate the same portion of the upper slit.

The same portion of the upper entrance slit is thus alternately illuminated by emission from the luminescent sample 40 and by reference light from the monochromatic calibration beam. The emission from the sample and the reference light pass successively through the monochromator 201 and are directed from the lower exit slit, the filter 212 and the mirror 230 to the same detector 100.

Figure 10:
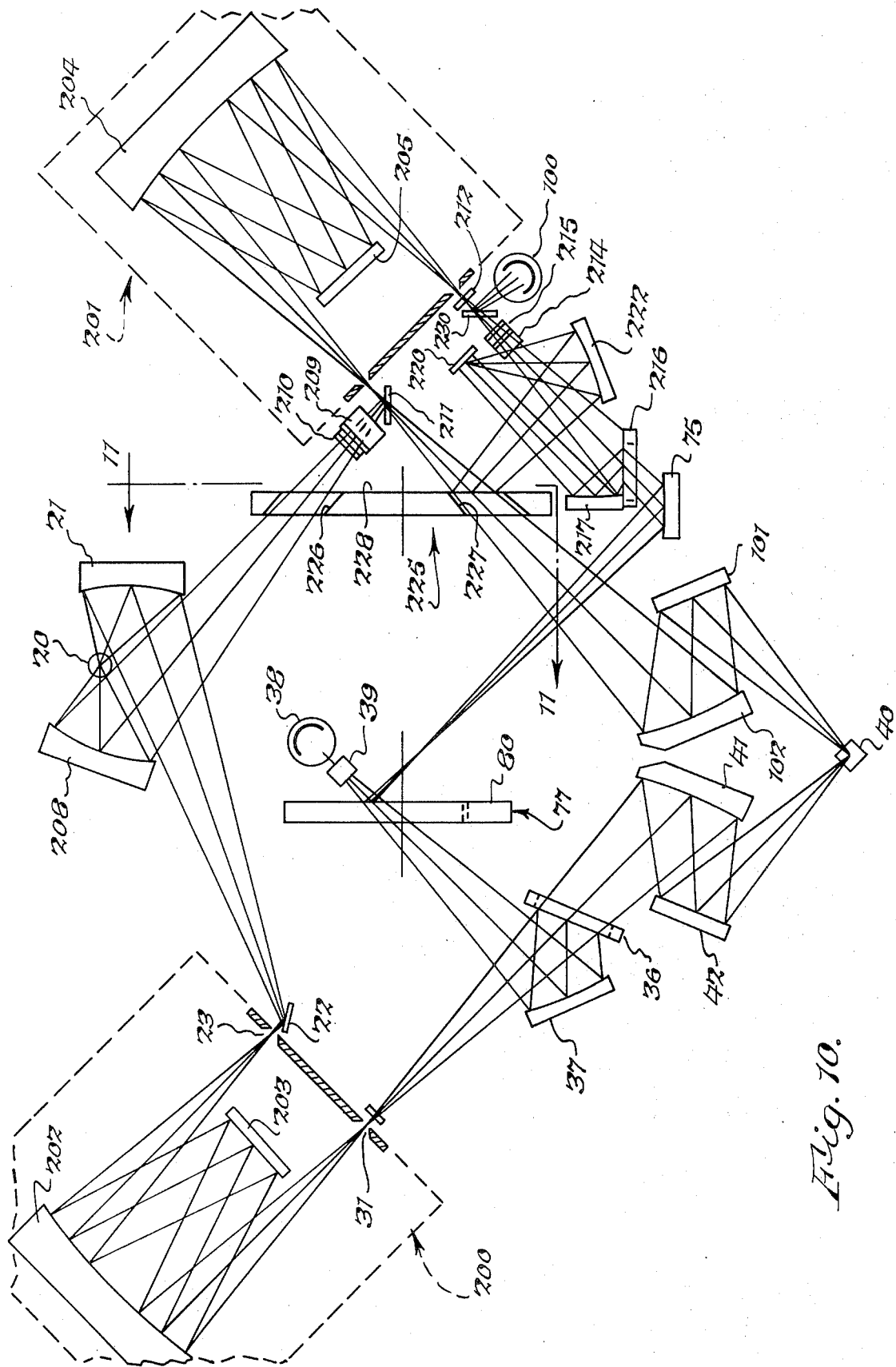
FIG. 10 is a simplified schematic plan view, with portions shown in section, of a luminescence spectrophotometer in accordance with another illustrative embodiment of the invention.

It will be noted that the chopper 105 of the FIG. 1 embodiment has been omitted from the embodiment of FIG. 10. The excitation light from the source 20 and the mirror 208 periodically passes through the cut-outs 226 and 227 in the chopper 225 but is blocked by the chopper during the time the luminescent beam is received by the monochromator 201. With this arrangement, the chopper serves to shield the luminescent beam from the comparatively bright excitation beam.

The current signals from the detectors 38 and 100 in the embodiment of FIG. 10 are fed to an electrical circuit of the type illustrated in FIG. 9. The dark signals from the two detectors are determined by shutting of the light before each measurement and are held in the circuit for use until measured. The switching functions of the circuits 121 and 131 are performed by a switching chopper, such as the chopper 145 (FIG. 7), or by a suitable electro-mechanical switching device (not shown).

As with the previous embodiment, the embodiment of FIGS. 10 and 11 includes three separate optical systems which each subject the corresponding beam portions to compensating losses in transmission. Thus, the optical system including the beam splitter 36 and the mirrors 37, 41 and 42 subjects the two portions of the monochromatic excitation beam to the same number of reflections at approximately the same angles of incidence as the beam portions proceed along their respective paths to the calibration detector 38 and the sample 40. Similarly, the optical system including the beam splitter 216, the mirrors 75 and 217, and the reflecting surface 80 of the chopper 77 subjects the two portions of the monochromatic calibration beam to the same number of reflections at the same angles of incidence as the portions are directed along their respective paths to the detector 38 and the depolarizer 220. The depolarized portion of the calibration beam and the emission from the sample are subjected to the same number of reflections by the optical system including the mirrors 101, 102 and 222 and the reflecting surface 228 of the chopper 225. Each of the three optical systems produces losses in the corresponding beams which are approximately cancelled out and do not appear in the final measurement.

Figure 12:
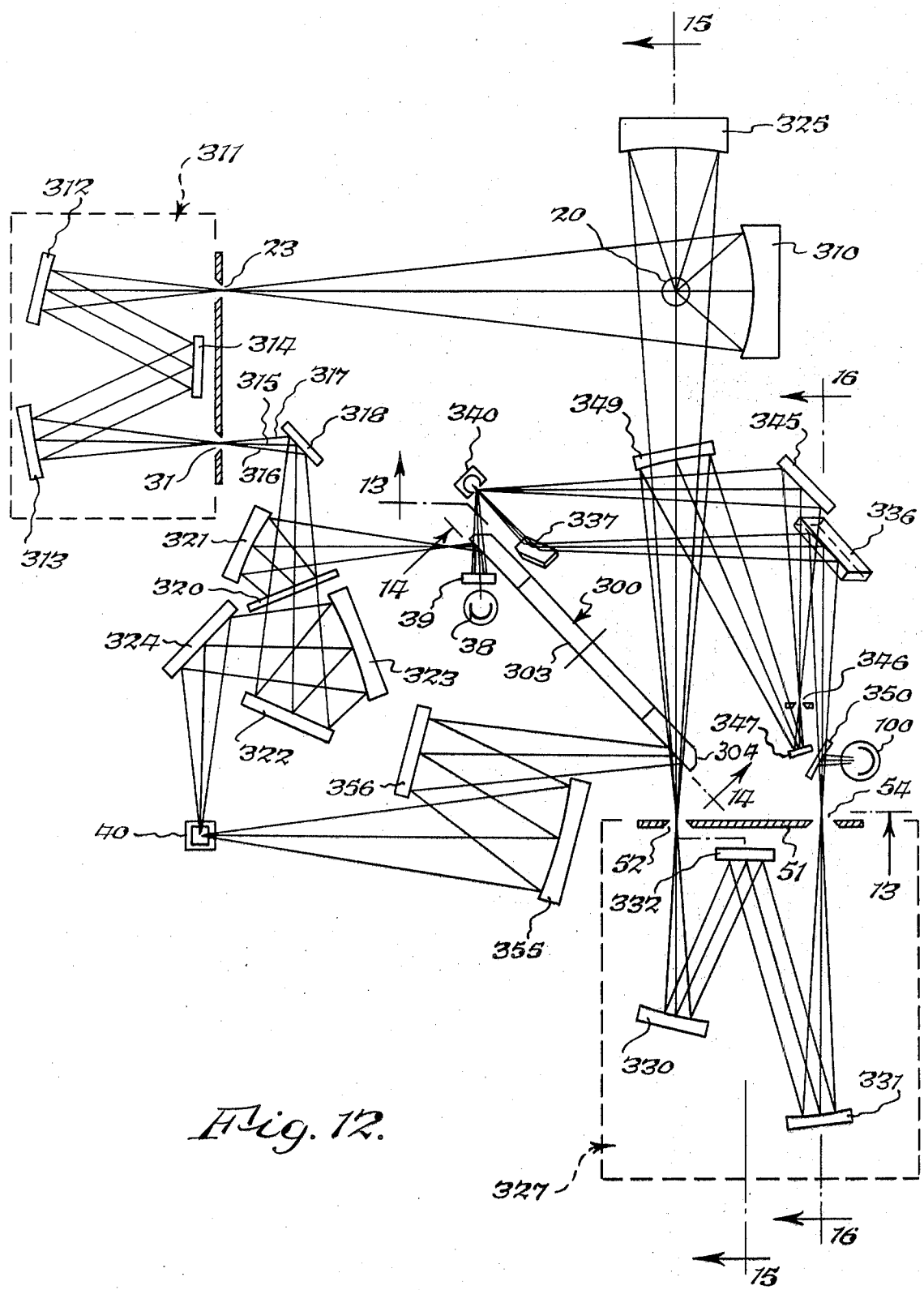
FIG. 12 is a simplified schematic plan view, with portions shown in section, of a luminescence spectrophotometer in accordance with a further illustrative embodiment of the invention.

Certain important embodiments of the invention utilize only a single reflecting chopper to provide the desired alternation of light beams to the two detectors of the instrument. Referring to FIGS. 12 and 14, for example, there is shown a reflecting chopper 300 having diametrically opposed cut-outs 301 and 302. One side of the chopper 300 includes a reflecting surface 303 and four dark sectors 306. The surface 303 is located in position to reflect light to both the reference detector and the luminescence monochromator.

The instrument of FIG. 12 includes an ellipsoidal mirror 310 disposed adjacent the excitation source 20. The mirror 310 receives light from the source 20 and directs it to an excitation monochromator 311. The monochromator 311 includes a pair of spaced concave mirrors 312 and 313 and a reflection grating 314. The excitation light enters through the entrance slit 23 and is reflected by the mirror 312 to the grating 314. The light then proceeds to the mirror 313 and emerges from the exit slit 31 in the form of a highly monochromatic excitation beam represented schematically by a principal ray 315 and two side rays 316 and 317.

The excitation beam is reflected by a directional mirror 318 to a beam splitter 320. A fixed fraction of the beam is diverted by the splitter 320 to a mirror 321. The mirror 321 directs the light to the reflecting surface 303 of the chopper 300. The light proceeds from the surface 303 to the fluorescent member 39 where some of it is remitted to the detector 38 to produce an excitation signal corresponding to the intensity of the source 20 at the selected wavelength.

The remaining fraction of the excitation beam passes through the beam splitter 320 and is reflected onto the luminescent sample 40 by mirrors 322, 323 and 324. The sample 40 is excited by the incident light and produces fluorescent emission of a wavelength different from that of the exciting light.

Light from the source 20 also is collected by an ellipsoidal mirror 325. As best shown in FIG. 15, the mirror 325 is angularly disposed above the source 20 at the level of the upper channel entrance slit 52 of an emission or luminescence monochromator 327. The mirror 325 focuses a light beam on the entrance slit.

The luminescence monochromator 327 includes upper and lower channels which are defined by separate optical systems. The upper channel includes a pair of concave mirrors 330 and 331 and a reflection grating 332, while the lower channel similarly includes concave mirrors 333 and 334 (FIGS. 15 and 16) and a grating 335. The components of the two channels are respectively disposed in vertical alignment with one another in position to receive and monochromatize the light introduced into corresponding channel.

The beam from the upper channel entrance slit 52 is reflected by the mirror 330 to the grating 332. The light then proceeds to the mirror 331 and out the upper channel exit slit 54 in the form of a highly monochromatic calibration beam. The calibration beam is reflected and focused by angularly disposed directional mirrors 336 and 337 to a diffuse reflector 340 which is in the form of a depolarizing beam splitter. The reflector 340 is located in close proximity with the peripheral surface 304 of the continuously rotating chopper 300.

The reflector 340 converts the incident beam into diffuse, depolarized light emitted in all directions. The reflector thus serves as an auxiliary source of scattered calibration light. A portion of the calibration light is directed toward the chopper 300 to the fluorescent member 39 and then to the calibration detector 38. As the chopper 300 rotates, the detector 38 is alternately exposed to light corresponding to the calibration light beam and to light corresponding to the beam from the mirror 321 and the chopper's reflective surface 303. The detector produces alternate current signals proportional to the intensities of the calibration and excitation beams in the manner described heretofore.

Another portion of the calibration light from the diffuse reflector 340 is focused by a mirror 345 on a curved external slit 346. An image of the slit 346 is reflected by a directional mirror 347 and a tilted concave mirror 349 to the chopper 300 and then to the lower channel entrance slit 48 (FIGS. 13 and 15) of the monochromator 327. As shown schematically in FIG. 13, the entrance slit 48 includes a slight curvature which helps to balance out distortion by the grating 335. The concave mirror 349 is tilted toward the concave side of the slit 48, and the perpendicular distance from the entrance slit to a line normal to the mirror's surface at its intersection with the optic axis is approximately equal to the radius of curvature of the slit. The location and definition of the optical components is such that an image of the external slit 346 is formed in the open area of the slit 48 without coming in contact with the slit jaws. With this arrangement, light losses on the jaws of the slit 48 are avoided.

The light entering the monochromator 327 through the slit 48 follows a path from the collimating mirror 333 (FIG. 15) to the grating 335, then to the mirror 334 (FIG. 16) and then out the lower channel exit slit 53. The emerging light is reflected by a mirror 350 to the detector 100.

One of the more significant differences between the instrument of FIGS. 12-16 and those of the preceding figures is that the chopper 300 is effective to reflect the unknown luminescent beam rather than the reference beam. Luminescent emission from the sample 40 is directed toward the reflecting surface 303 of the chopper 300 by a concave mirror 355 and a flat mirror 356. The chopper 300 is disposed in the light path between the mirror 356 and the lower channel entrance slit 48. The sample beam is periodically reflected by the chopper surface 303 to the slit 48, and the light emerges from the exit slit 53 in the form of a monochromatic luminescent beam. Upon continued rotation of the chopper 300, the cut-outs 301 and 302 admit the calibration light to the slit 48, and the luminescent light is no longer received by the slit.

The arrangement is such that the same portion of the entrance slit 48 is alternately illuminated by light from the luminescent sample 40 and by reference light from the calibration beam. The sample light and the reference light pass successively through the same monochromator channel and are directed by the mirror 350 to the same detector 100. The detector produces alternate current signals respectively corresponding to the intensities of these two beams.

The signals from the detectors 38 and 100 are applied to an electrical circuit of a type similar to that described above. The electrical circuit also receives background or dark signals when the sectors 306 (FIG. 14) are in the corresponding light paths. The circuit substracts the dark signals and produces an output signal corresponding to the quotient of the ratio of the sample signal to the reference signal from the detector 100 divided by the ratio of the excitation signal to the calibration signal from the detector 38. The output signal comprises an accurate representation of the ratio of sample to excitation intensities and is independent of the brightness and wavelength distribution of the source 20, the sensitivities and response functions of the detectors, and transmission and reflection variables.

The optical systems for the two portions of the excitation beam, and the reference and luminescent beams, subject the beams to equal losses which cancel out in the manner described heretofore. The portion of the monochromatic excitation beam reaching the detector 38 undergoes three reflections, one by the beam splitter 320, another by the mirror 321 and a third by the chopper 300, at angles of incidence of 22.5°, 22.5° and 45°, respectively. The portion of the excitation beam directed toward the sample 40 similarly undergoes three reflections, by the mirrors 322, 323 and 324, at respective angles of incidence of 22.5°, 22.5° and 45°. Accordingly, the beam portions reaching the detector 38 and the sample 40 are both attenuated by comparable reflection losses.

In a similar manner, the optical system comprising the mirrors 345, 347, 349, 355, 356 and the chopper 300 subjects the reference or calibration light from the depolarizer 340 and the light from the luminescent sample 40 to the same number of specular reflections at the same angles of incidence as the light proceeds to the entrance slit 48. The calibration light from the depolarizer 340 is reflected by the mirror 345 at a 45 degree angle of incidence and by each of the mirrors 347 and 349 at a 12.5° angle of incidence. The light from the sample 40 also undergoes two reflections, by the mirrors 355 and 356 at 12.5° angles of incidence and a third reflection by the chopper 300 at a 45° angle of incidence. With this arrangement, the beams reaching the slit 48 exhibit comparable reflection losses.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for measuring luminescent radiation comprising, in combination:
   a source of radiation;
   a monochromator for isolating an excitation beam of monochromatic radiation from said source;
   means for dividing the monochromatic excitation beam into two parts;
   a sample of luminescent material;
   first radiation detecting means;
   a first optical system for illuminating the sample with the first part of the monochromatic excitation beam and for intermittently directing the second part of the excitation beam to the first radiation detection means;
   luminescence monochromator means having first and second channels for isolating radiation of the same wavelength;
   means for illuminating the first of the channels with radiation, to produce a calibration beam of monochromatic radiation;
   means for dividing the monochromatic calibration beam into two parts;
   means for directing the first part of the monochromatic calibration beam to the first detecting means in alternation with the second part of the excitation beam, the first detecting means producing a first calibration signal and an excitation signal respectively corresponding to the first part of the calibration beam and the second part of the excitation beam;
   a second optical system for alternately directing a beam of radiation from the sample and the second part of the monochromatic calibration beam to the same portion of said second channel, to produce a monochromatic beam corresponding alternately to the sample beam and the second part of the calibration beam;
   second radiation detecting means;
   means for directing the alternating monochromatic sample and second calibration beams to the second detecting means, the second detecting means producing a sample signal and a second calibration signal respectively corresponding to the sample beam and the second part of the calibration beam; and
   means for combining the first and second calibration signals, the excitation signal and the sample signal to produce an output signal representative of the ratio between the sample beam and the excitation beam.

2. Apparatus as defined in claim 1, in which the first channel of the luminescent monochromator means is illuminated with radiation from said source.

3. Apparatus as defined in claim 1, which further comprises:
   a single reflecting chopper cooperating with both of said optical systems for controlling the alternation of the sample beam, the second part of the excitation beam and the two parts of the monochromatic calibration beam.

4. Apparatus as defined in claim 1, which further comprises:

a first reflecting chopper cooperating with said first optical system for controlling the alternation of the first part of the monochromatic calibration beam and the second part of the excitation beam; and a second reflecting chopper cooperating with said second optical system for controlling the alternation of the sample beam and the second part of the monochromatic calibration beam.

5. A luminescence spectrophotometer comprising, in combination:

a light source;

means for isolating an excitation beam of monochromatic light from said source;

means for dividing the monochromatic excitation beam into two parts;

a sample of luminescent material;

a first detector having known response characteristics;

a first optical system for continuously directing the first part of the monochromatic excitation beam to the luminescent sample and for intermittently directing the second part of the monochromatic excitation beam to the first detector, the sample emitting luminescent radiation in response to said excitation beam;

emission monochromator means having first and second channels for isolating light of the same wavelength;

means for illuminating the first of the channels with light from the source, to produce a monochromatic calibration beam;

a second optical system for dividing the monochromatic calibration beam into two parts and for directing a first part of the calibration beam to the first detector in alternation with the second part of the excitation beam, the first detector producing a first calibration signal and an excitation signal respectively corresponding to the first part of the calibration beam and the second part of the excitation beam, the second optical system including means forming a depolarized second part of the calibration beam;

a third optical system for collecting depolarized radiation from the second part of the calibration beam and for alternately directing the collected radiation and a beam of luminescent radiation from the sample to said second channel, to produce a monochromatic beam corresponding alternately to the sample beam and the second part of the calibration beam;

a second detector;

means for directing the alternating sample and second calibration beams to the second detector, the second detector producing a sample signal and a second calibration signal respectively corresponding to the sample beam and the second part of the calibration beam; and means for forming from the first and second calibration signals, the excitation signal and the sample signal an output representative of the ratio between the sample beam and the excitation beam.

6. A luminescence spectrophotometer as defined in claim 5, in which each of said optical systems subjects its two beam portions to compensating losses in transmission.

7. A luminescence spectrophotometer as defined in claim 6, in which each of said optical systems subjects its two beam portions to the same number of reflections at approximately the same angles of incidence.

8. A luminescence spectrophotometer comprising, in combination:

a source of radiation;

a monochromator for isolating an excitation beam of monochromatic radiation from said source;

beam splitting means for dividing the monochromatic excitation beam into two parts;

a sample of luminescent material;

a first radiation detector having known response characteristics;

a first optical system for illuminating the sample with the first part of the monochromatic excitation beam and for intermittently directing the second part of the excitation beam to the first radiation detector;

emission monochromator means having first and second channels for isolating radiation of the same wavelength;

means for illuminating the first of the channels with radiation from the source, to produce a calibration beam of monochromatic radiation;

means including a depolarizing beam splitter for dividing the monochromatic calibration beam into first and second parts;

means for directing the first part of the calibration beam to the first radiation detector in alternation with the second part of the excitation beam, the first detector producing a first calibration signal and an excitation signal respectively corresponding to the calibration and excitation beams;

a second optical system for collecting depolarized radiation from the second part of the calibration beam and for alternately directing the collected radiation and a beam of radiation from the sample and the second part of the calibration beam to said second channel, to produce a monochromatic beam corresponding alternately to the sample beam and the second part of the calibration beam;

a second radiation detector;

means for directing the alternating sample and second calibration beams to the second detector, the second detector producing a sample signal and a second calibration signal respectively corresponding to the sample beam and the second part of the calibration beam; and means for forming from the first and second calibration signals, the excitation signal and the sample signal an output representative of the ratio between the sample beam and the excitation beam.

9. A luminescence spectrophotometer as defined in claim 8, in which each of the optical systems includes mirror means for reflecting the received parts of the beams, the mirror means in each system subjecting the two parts of its beams to the same number of reflections at approximately the same angles of incidence.

10. A luminescence spectrophotometer as defined in claim 9, in which the mirror means in the first optical system subjects each of the received beam parts to two reflections at about 22.5° angles of incidence and one reflection at about a 45° angle of incidence.

11. A luminescence spectrophotometer as defined in claim 9, in which the mirror means in the second optical system subjects each of the received beam parts to two reflections at about 12.5° angles of incidence and one reflection at about a 45° angle of incidence.

12. Apparatus for measuring luminescent radiation comprising, in combination:
a source of radiation;
a monochromator for isolating an excitation beam of monochromatic radiation from said source;
first beam splitting means for dividing the monochromatic excitation beam into two parts;
a sample of luminescent material;
a first radiation detector;
a first optical system including means for illuminating the sample with the first part of the monochromatic excitation beam, a first reflecting chopper, and means for directing the second part of the excitation beam to one side of the first chopper and then intermittently to the first radiation detector;
luminescence monochromator means having first and second channels for isolating radiation of the same wavelength;
radiation directing means for illuminating the first of the channels with radiation from the source, to produce a calibration beam of monochromatic radiation;
a second optical system including second beam splitting means for dividing the monochromatic calibration beam into two parts, and means for directing the first part of the calibration beam to the opposite side of the first chopper and then to the first radiation detector in alternation with the second part of the excitation beam, the first detector producing a first calibration signal and an excitation signal respectively corresponding to the first part of the calibration beam and the second part of the excitation beam;
a third optical system including an additional reflecting chopper and means for directing a beam of radiation from the sample and the second part of the monochromatic calibration beam to opposite sides of the additional chopper and then alternately to the same portion of said second channel, to produce a monochromatic beam corresponding alternately to the sample beam and the second part of the calibration beam;
a second radiation detector;
means for directing the alternating monochromatic sample and second calibration beams to the second detector, the second detector producing a sample signal and a second calibration signal respectively corresponding to the sample beam and the second part of the calibration beam; and
means for combining the first and second calibration signals, the excitation signal and the sample signal to produce an output signal representative of the ratio between the sample beam and the excitation beam.

13. Apparatus as defined in claim 12, which further comprises:
chopping means in close juxtaposition with the luminescent monochromator means for simultaneously blocking both of said channels at periodic intervals.

14. Apparatus as defined in claim 12, in which the additional chopper is interposed between the radiation directing means and the luminescence monochromator means to periodically interrupt the source radiation illuminating said first channel.

15. Radiation measuring apparatus comprising, in combination:
a source of radiation;
means for isolating an excitation beam of monochromatic radiation from said source;
means for dividing the monochromatic excitation beam into two parts;
a sample of luminescent material;
means for illuminating the sample with a first part of the monochromatic excitation beam;
luminescence monochromator means having first and second channels for isolating radiation of the same wavelength;
means for directing radiation to the first of the channels, to produce a calibration beam of monochromatic radiation;
means for dividing the monochromatic calibration beam into two parts;
a first radiation detector;
means including a continuously rotating reflecting chopper;
a first optical system for directing the first part of the monochromatic calibration beam and the second part of the excitation beam to opposite sides of the reflecting chopper and then alternately to the first radiation detector, the first detector producing a first calibration signal and an excitation signal respectively corresponding to the first part of the calibration beam and the second part of the excitation beam;
a second optical system for directing a beam of radiation from the sample and the second part of the monochromatic calibration beam to opposite sides of the reflecting chopper and then alternately to the second channel of the luminescence monochromator means, to produce a monochromatic beam corresponding alternately to the sample beam and the second part of the calibration beam;
a second radiation detector;
means for directing the alternating monochromatic sample and second calibration beams to the second detector, the second detector producing a sample signal and a second calibration signal respectively corresponding to the sample beam and to the second part of the calibration beam; and
means for forming from the first and second calibration signals, the excitation signal and the sample signal an output representative of the ratio between the luminescent radiation and the excitation radiation.

16. Radiation measuring apparatus comprising, in combination;
a source of radiation;
a monochromator for isolating an excitation beam of monochromatic radiation from said source;
means for dividing the monochromatic excitation beam into two parts;
a sample of luminescent material;
means for illuminating the sample with a first part of the monochromatic excitation beam;
monochromator means having first and second channels for isolating radiation of the same wavelength, each of the channels having an entrance slit and an exit slit;
means for illuminating the entrance slit of the first of the channels with radiation from the source, to produce a calibration beam of monochromatic radiation at the exit slit of said first channel;

means for dividing the monochromatic calibration beam into two parts;

a first radiation detector;

a first optical system for alternately directing the first part of the monochromatic calibration beam and the second part of the excitation beam to the first radiation detector, the first detector producing a first calibration signal and an excitation signal respectively corresponding to the first part of the calibration beam and to the second part of the excitation beam;

means defining an additional slit;

a second optical system for directing beams of radiation to a common portion of the second channel entrance slit alternately from the sample and from the second part of the calibration beam through the additional slit, to produce a monochromatic beam at the second channel exit slit corresponding alternately to the sample beam and the second part of the calibration beam, the second optical system including means for forming an image of the additional slit which is narrower than the width of the second channel entrance slit;

a second radiation detector;

means for directing the alternating monochromatic sample and second calibration beams to the second detector, the second detector producing a sample signal and a second calibration signal respectively corresponding to the sample beam and to the second part of the calibration beam; and means for forming from the first and second calibration signals, the excitation signal and the sample signal an output representative of the ratio between the intensities of the sample beam and the excitation beam.

17. Apparatus as defined in claim 16, in which the second channel entrance slit has a finite radius of curvature, the second optical system including a concave mirror for forming said image at said second channel entrance slit.

18. Apparatus as defined in claim 17, in which the concave mirror has a center of curvature, the perpendicular distance from the second channel entrance slit to a line normal to the mirror's surface at its intersection with the optic axis being approximately equal to the radius of curvature of said second channel entrance slit.

19. In radiation measuring apparatus, in combination:

a calibration source of monochromatic radiation of known intensity;

means defining a first slit in spaced relationship with the calibration source;

monochromator means having an entrance slit and an exit slit for isolating radiation of the same wavelength as that of the monochromatic source, each of the entrance and exit slits being defined by a pair of opposed jaws with an open area therebetween;

an optical system for directing monochromatic radiation from said source to the first slit and then to the entrance slit of the monochromator means, to produce a monochromatic calibration beam at the exit slit, the optical system including means for forming an image of the first slit at the entrance slit which is narrower than the width of the entrance slit;

a sample source of radiation of unknown intensity;

means for periodically interrupting the radiation from the first slit and illuminating the entrance slit with radiation from the sample source, to produce a monochromatic sample beam at the exit slit; and detector means responsive to the calibration and sample beams from the exit slit for respectively producing a calibration signal and a sample signal.

20. In radiation measuring apparatus as defined in claim 19, the entrance slit having a radius of curvature, and the image forming means comprising a concave mirror having a center of curvature, the perpendicular distance from the entrance slit to a line normal to the mirror's surface at its intersection with the optic axis being approximately equal to the radius of curvature of the entrance slit.

21. Radiation measuring apparatus comprising, in combination:

a light source; means for isolating an excitation beam of monochromatic light from said source;

means for dividing the monochromatic excitation beam into two parts;

a sample of luminescent material;

a first detector having known response characteristics;

a first optical system for continuously directing the first part of the monochromatic excitation beam to the luminescent sample and for intermittently directing the second part of the monochromatic excitation beam to the first detector, the sample emitting luminescent radiation in response to said excitation beam;

monochromator means having first and second channels for isolating light of the same wavelength;

means for illuminating the first of the channels with light from the source, to produce a monochromatic calibration beam;

a second optical system for dividing the monochromatic calibration beam into two parts and for directing the first part of the calibration beam to the first detector in alternation with the second part of the excitation beam, the first detector producing a first calibration signal and an excitation signal respectively corresponding to the first part of the calibration beam and the second part of the excitation beam;

a third optical system for alternately directing a beam of luminescent radiation from the sample and the second part of the calibration beam to the same portion of said second channel, to produce a monochromatic beam corresponding alternately to the sample beam and the second part of the calibration beam;

a second detector;

means for directing the alternating sample and second calibration beams to the second detector, the second detector producing a sample signal and a second calibration signal respectively corresponding to the sample beam and the second part of the calibration beam; and electrical circuit means connected to the first and second detectors for producing an output signal corresponding to the ratio of the sample signal to the second calibration signal divided by the ratio of the excitation signal to the first calibration signal.

22. A luminescence spectrophotometer comprising, in combination:
a source of radiation;
a monochromator for isolating an excitation beam of monochromatic radiation from said source;
first beam splitting means for dividing the monochromatic excitation beam into two parts;
a sample of luminescent material;
a first radiation detector having known response characteristics;
a first optical system for illuminating the sample with the first part of the monochromatic excitation beam and for intermittently directing the second part of the excitation beam to the first radiation detector;
emission monochromator means having first and second channels for isolating radiation of the same wavelength;
means for illuminating the first of the channels with radiation from the source, to produce a calibration beam of monochromatic radiation;
a second optical system including second beam splitting means for dividing the monochromatic calibration beam into two parts, and means for passing the first part of the calibration beam to the first radiation detector in alternation with the second part of the excitation beam, the first detector producing a first calibration signal and an excitation signal respectively corresponding to the first part of the calibration beam and the second part of the excitation beam, the second optical system having means for forming a depolarized second part of the calibration beam;
a third optical system for collecting depolarized radiation from the second part of the calibration beam and for alternately directing the collected radiation and a beam of radiation from the sample to the same portion of said second channel, to produce a monochromatic beam corresponding alternately to the sample beam and the second part of the calibration beam;
a second radiation detector;
means for directing the alternating sample and second calibration beams to the second detector, the second detector producing a sample signal and a second calibration signal respectively corresponding to the sample beam and the second part of the calibration beam;
means for periodically blocking the radiation reaching the first and second detectors to produce background signals;
first circuit means for subtracting the background signals from the corresponding detector signals to form a net first calibration signal, a net excitation signal, a net second calibration signal and a net sample signal; and
second circuit means for producing an output signal corresponding to the ratio of the net sample signal to the net second calibration signal divided by the ratio of the net excitation signal to the net first calibration signal.

23. A luminescence spectrophotometer as defined in claim 22, in which the radiation blocking means includes a rotary chopper for blocking the emission monochromator means at periodic intervals.

24. A luminescence spectrophotometer as defined in claim 22, in which each of the monochromator channels has an entrance slit and an exit slit, the effective width of the exit slit for the second channel being greater than the combined effective widths of each of the three other slits.

25. A luminescence spectrophotometer as defined in claim 22, in which the third optical system subjects the radiation from the depolarizing means and the beam of radiation from the sample to the same number of reflections at approximately the same angles of incidence.

26. A luminescence spectrophotometer as defined in claim 22, which further comprises:
chopper means for controlling the first circuit means to separate the successive signals from the first and second detectors.

27. A luminescence spectrophotometer comprising, in combination:
a source of radiation;
a first monochromator for isolating an excitation beam of monochromatic radiation from said source;
means for dividing the monochromatic excitation beam into two parts;
a sample of luminescent material;
a first radiation detector;
a first optical system including means for illuminating the sample with the first part of the monochromatic excitation beam, a first reflecting chopper, and means for directing the second part of the excitation beam to one side of the first chopper and then intermittently to the first radiation detector;
a second monochromator having first and second channels for isolating radiation of the same wavelength;
means for illuminating the first of the channels with radiation from the source, to produce a calibration beam of monochromatic radiation;
a second optical system including means for dividing the calibration beam of monochromatic radiation into two parts, and means for directing the first part of the calibration beam to the opposite side of the first chopper and then to the first radiation detector in alternation with the second part of the excitation beam, the first detector producing a first calibration signal and an excitation signal respectively corresponding to the calibration beam and the second part of the excitation beam;
a third optical system including an additional reflecting chopper and means for directing a beam of radiation from the sample and the second part of the calibration beam to opposite sides of the additional chopper and then alternatively to the same portion of said second channel, to produce a monochromatic beam corresponding alternately to the sample beam and the second part of the calibration beam;
a second radiation detector;
means for directing the monochromatic alternating sample and second calibration beam to the second detector, the second detector producing a sample signal and a second calibration signal respectively corresponding to the sample beam and the second part of the calibration beam;

radiation blocking means including a third chopper for periodically interrupting the radiation being directed to the second monochromator; and electrical circuit means connected to the first and second detectors for producing an output signal corresponding to the ratio of the sample signal to the second calibration signal divided by the ratio of the excitation signal to the first calibration signal.

28. A luminescence spectrophotometer comprising, in combination:

a light source;

emission monochromator means having first and second channels for isolating light of the same wavelength;

means for illuminating the first of the channels with light from the source, to produce a monochromatic calibration beam;

a first detector;

means for dividing the monochromatic calibration beam into two parts and for passing one part directly to the first detector;

means for isolating an excitation beam of monochromatic light from said source;

a sample of luminescent material;

a first optical system for directing one part of the monochromatic excitation beam to the sample, the first optical system reflecting said one part of the excitation beam twice at angles of incidence of about 22.5° and once at an angle of incidence of about 45°;

a second optical system for directing another part of the monochromatic excitation beam to the first detector in alternation with said one part of the monochromatic calibration beam, the second optical system reflecting said other part of the excitation beam twice at angles of incidence of about 22.5° and once at an angle of incidence of about 45°, the first detector producing alternate signals corresponding to alternate pulses of light from the calibration beam and from the sample beam;

a third optical system for directing another part of the monochromatic calibration beam to the second channel of the emission monochromator means, the third optical system providing three reflections of said other part of the calibration beam, once at an angle of incidence of about 45 degrees and twice at about equal angles of incidence;

a fourth optical system for directing luminescent radiation from the sample to the second channel of the emission monochromator means in alternation with said other part of the monochromatic calibration beam, the fourth optical system providing three reflections of said luminescent radiation, once at an angle of incidence of about 45° and twice at angles of incidence about equal to the equal angles in the third optical system, to form a combined beam of light pulses alternately from the sample and from the calibration beam;

a second detector; and means for directing the combined beam to the second detector, the second detector producing alternate signals corresponding to the sample radiation and to said other part of the calibration beam.

29. A luminescence spectrophotometer as defined in claim 28, which further comprises:

means for combining the signals from the first and second detectors to produce an output signal representative of the ratio between the sample radiation and the excitation beam.

30. A luminescence spectrophotometer as defined in claim 28, wherein the means for dividing the monochromatic calibration beam into two parts diffuses and depolarizes both parts of said calibration beam.

* * * * *